Oct. 21, 1952  LA VERNE J. WINSLOW  2,614,354
PICTURE FRAME
Filed July 30, 1948
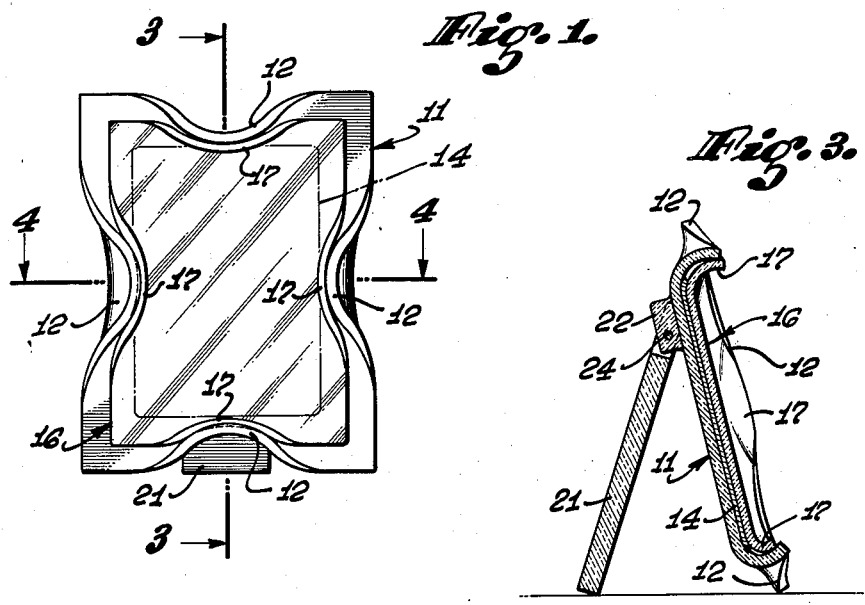
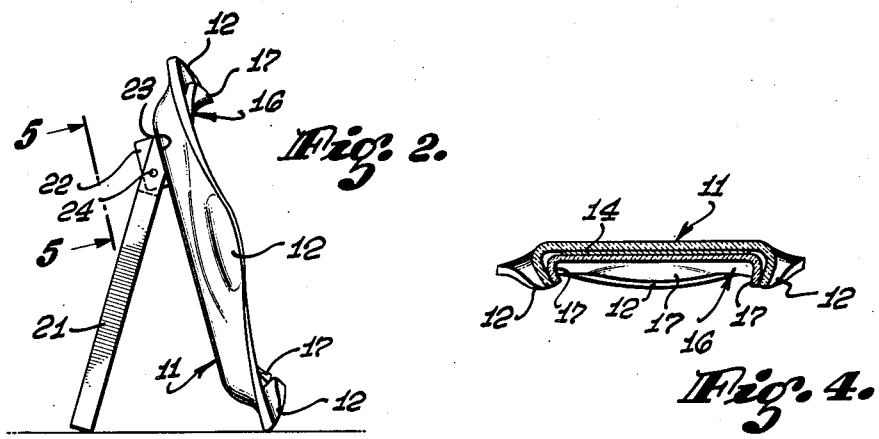
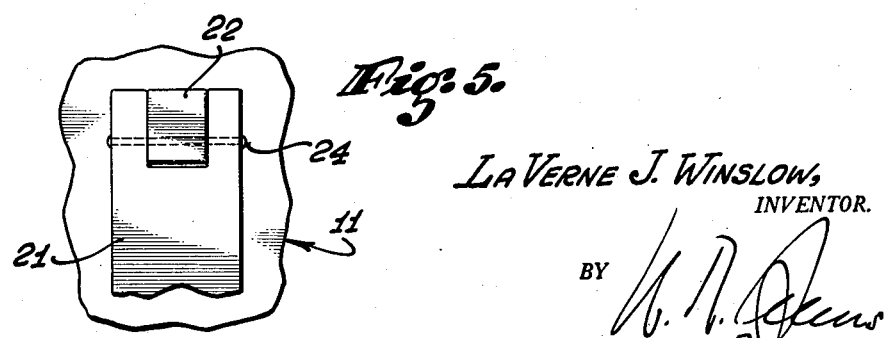
LA VERNE J. WINSLOW,
INVENTOR.
BY
ATTORNEY.

UNITED STATES PATENT OFFICE 2,614,354

PICTURE FRAME

La Verne J. Winslow, Pasadena, Calif.

Application July 30, 1948, Serial No. 41,585

3 Claims. (Cl. 40—156)

The present invention relates to picture frames in general and more particularly to a picture frame in which the picture proper to be protected may be easily positioned and removed. More specifically the invention comprises a picture frame construction in which the picture to be protected is retained by a flexible overlying transparent member itself locked with respect to the frame back by its own resilience or flexibility.

Pictures are one of the most valued possessions of mankind, and their care and protection have received a great deal of his attention. The mounting of a fine painting in a splendid frame adds materially to the picture itself and to the enjoyment of those viewing it. The proper mounting of even a small photograph enhances its interest and artistic merits.

Frames are of many designs and types. The present frame construction relates to that type which embodies an overlying protective member for the picture to be mounted. In its usual form this type of construction includes an encircling frame member suitably recessed or grooved on its rearward side to seat the peripheral edge of a protecting transparent member of glass or plastic. The picture proper to be protected lies against this glass and is covered by a suitable backing which may be nailed or otherwise secured around its edges to the recessed frame member. Sometimes a matt overlies a portion of the picture and is positioned between it and the protective glass. In such constructions the removal and change of pictures within the frame requires the removal of the nails or other securing members by which the back is held to the frame and the subsequent displacement of the picture itself.

The present invention comprises a picture frame unit in which the frame provides its own picture-supporting back against which the picture rests and against which it is held by an overlying protecting transparent member retaining it in place and protecting it in the manner of the usual glass. The protecting member is itself frictionally locked to the forward face of the frame back and is readily displaced to remove or to adjust the picture.

It is an object of the present invention to provide a new and improved picture frame unit in which the picture-protecting transparent element or glass is manually displaceable from the forward face of a supporting back without the necessity of the removal of securing elements.

Another object of the invention is to provide a picture frame unit in which the transparent picture-protecting element engages the forward face of the frame back to clamp the protected picture in place.

Still another object of the invention is to provide a picture frame unit in which certain of the peripheral edges of the frame back are extended inwardly to engage and to overlie corresponding portions of the transparent picture-protecting element overlying its face and which is displaceable relative thereto by virtue of its own inherent flexibility.

Still another object of the invention is to provide a plastic picture frame unit in which the frame back is provided along its peripheral sides with rounded inwardly extending curved portions extended inwardly into retaining relationship with a similarly contoured overlying transparent element displaceable upon slight distortion permitted by its own flexibility.

These and other more specific objects will appear upon reading the following specification and claims and upon considering in connection therewith the attached drawing to which they relate.

Referring now to the drawing in which a preferred embodiment of the invention is illustrated:

Figure 1 is a front view of a picture frame unit constructed in accordance with the present invention;

Figure 2 is a side view of the construction of Figure 1;

Figure 3 is a vertical medial section upon the line 3—3 of Figure 1;

Figure 4 is a transverse horizontal section upon the line 4—4 of Figure 1;

Figure 5 is a rear view looking in the direction of the arrows upon the line 5—5 of Figure 2 showing the pivotal mounting of the supporting arm of the frame.

Referring again to the drawing, a picture frame unit constructed in accordance with the present invention is illustrated and is seen to comprise a back 11 which may be made of a thermoplastic, if desired, or other suitable material, and a major portion of which lies in a single flat plane which is centrally recessed with respect to the peripheral edges. As illustrated, the back 11 is rectangular but it may have other configurations without varying the basic concept. At opposite points, and along its edges, back 11 is formed with inwardly extended rounded curved portions 12 which have an appearance as though the back had been subjected to a forward and inward pressure from a rounded object which had imparted a permanent deformation or set. With the back 11 made of a thermoplastic this is exactly the process which may be used, the force being exerted by the thumb and forefinger in one preferred method. The extent of the inward curvature and its length along the edge of the back is a variable, it being essential that at least two of the diametrically apposed portions 12, referred to as locking portions, be sufficiently displaced as to provide an overlapping relationship to the flat portion of the back. The remaining pair of curved portions 12 need not be displaced to the same extent as they need only function as abutments to prevent lateral displacement.

The picture to be protected is indicated in the drawing by the reference character 14 and lies flat against the recessed central flat portion of the back 11. If its size be suitable the curved portions 12 may perform a centering function therefor. To retain picture 14 against the back 11 there is provided an overlying transparent protecting member cover 16, the overall dimensions of which are less than those of the back 11 but its configuration preferably being the same. Transparent member 16 may be formed of any suitable material so long as it is transparent and characterized by a slight flexibility and resilience. Certain types of transparent thermoplastic serve admirably. As in the case of the back 11 member 16 is formed along its sides with rolled-in curved portions 17 of a general curvature and shape and so positioned as to extend adjacent the curved portions 12 of the back. Those portions 17 which lie adjacent the locking overlapping curved portions 12 of the back, comprising the horizontally spaced portions in the embodiment illustrated and as clearly shown in Figures 1 and 4, are curved inwardly sufficiently as to extend under the portions 12. Reference to Figure 4 discloses that one of the portions 17 at the side of the transparent member 16 fits snugly within the overlapping locking portion 12 while the opposite portion 17 is contoured to a slightly lesser degree in order that it may be displaced outwardly from the back and past the curvature 12 by a slight deflection. In the example illustrated the locking action takes place at the two sides of the unit, the curved portions 12 and 17 at the top and bottom serving merely as abutment surfaces to center the cooperating elements. However, the locking relationship could also be repeated top and bottom, it being critical only that in each pair of apposed curved portions the curvatures be such that one of the edges of member 16 is displaceable by an outward force upon a slight deflection of its curved portion 17. Curved portions 17 of the transparent member 16 can be formed in the manner of the portions 12 upon the back 11, if desired, or they may be molded in place.

The exact curvature and displacement of the curved portions 12 and 17 is not critical so long as the transparent member 16 has sufficient extent as to enable the curved portions 17 to extend under the adjacent curved portions 12 of the back 11, and further so long as at least one of the curved portions 17 of each apposed pair is displaceable from the adjacent overlying curved portion 12 under which it extends. This displacement is possible primarily because of the flexibility of the transparent member 16 but the flexibility of the portion 12 of the back 11 also is a factor which may be used if desired. As is seen in the drawings the peripheral or marginal edges of the back and cover are, in each instance, spaced forwardly of the main central areas. These edges, particularly at the sides of the curved portions 12 and 17, provide abutting surfaces which limit the advance of the cover entirely independently of the abutment of the central areas and which would so function in the entire absence of abutting contact of said central areas.

A picture frame unit constructed in accordance with the present invention can be suspended on the wall, or may be positioned on a supporting surface. To make the latter possible a supporting leg 21 is provided, the upper end of which is bifurcated and extends at the sides of a fixed block 22 on the face of the back 11. The upper extremities of the leg 21 are cut at an angle, as indicated at 23, and the pivotal movement of the leg about the pin 24 by which it is mounted on the block 22 is limited to a suitable angle in which the frame tilts rearwardly slightly, as illustrated in Figures 2 and 3.

The assembly of the picture frame unit constructed in accordance with the present invention is believed to be clear from the foregoing. It being desired to place a picture in the unit, the transparent front plate 16 is removed by pulling outwardly at the side or sides at which the rounded portions 17 are displaceable from the overlapping curved portions 12 of the back by a slight deflection. With the transparent plate removed the picture 14 is then positioned. As stated, if its size be about that indicated in Figure 1 the rounded portions 12 of the back will perform a centering function. Otherwise it would be desirable to turn the back to a horizontal position with the picture on the top. The transparent plate member 16 is then positioned in its secured relationship to the plate by angularly advancing it so that those rounded portions 17 having the greatest included angle extend under the overlying curved portions 12. The remaining curved portions 17 are then forced inwardly by a slight pressure so that they are deflected past and slightly under the overlying locking portion or portions 12 to be retained until intentionally removed.

While the particular construction herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a picture frame, a semi-rigid plate-like back formed on its front face at spaced points around its marginal edge with integral forwardly and inwardly extending rounded portions substantially rigid in opposition to a displacing force normal to the plane of said back and of limited flexibility in opposition to a lateral displacing force, and a transparent semi-rigid plate-like picture-retaining member overlying the central portion of said back and formed around its marginal edge with integral forwardly and inwardly extending rounded portions spaced and positioned as to lie adjacent said rounded portions on said back, said rounded portions on said picture-retaining member being rigid in opposition to a displacing force normal to the plane of said member and of limited flexibility in opposition to a lateral displacing force, at least a pair of the rounded portions of said back engaging the rounded portions of said picture-retaining member to retain said member against said back, the outer surface of at least one of said rounded portions being contoured as to exert a lateral displacing force upon the adjacent rounded portion of said back upon said picture-retaining member being moved toward or from contact with the front face of said back.

2. The construction recited in claim 1 characterized in that pairs of adjacent rounded portions on said back and on said picture-retaining member are arranged upon opposite sides of said back and picture-retaining member.

3. The construction recited in claim 1 characterized in that the outer surfaces of a pair of said rounded portions on opposite sides of said picture-retaining member are contoured as to exert a lateral displacing force upon the adjacent rounded portions of said back upon said picture-retaining member being moved toward or from contact with said back.

LA VERNE J. WINSLOW.

REFERENCES CITED

The following references are of record in the file of this patent:

UNITED STATES PATENTS

| Number | Name | Date |
| --- | --- | --- |
| 737,124 | Manor | Aug. 25, 1903 |
| 863,364 | Decherd | Aug. 13, 1907 |
| 1,338,441 | Haley | Apr. 27, 1920 |
| 1,621,727 | Johnson | Mar. 22, 1927 |
| 1,692,999 | Siegel | Nov. 27, 1928 |
| 2,362,434 | Fitch et al. | Nov. 7, 1944 |

FOREIGN PATENTS

| Number | Country | Date |
| --- | --- | --- |
| 26,215 | Great Britain | Nov. 19, 1906 |
| 781,082 | France | Feb. 18, 1935 |